United States Patent Office 2,903,551
Patented Sept. 8, 1959

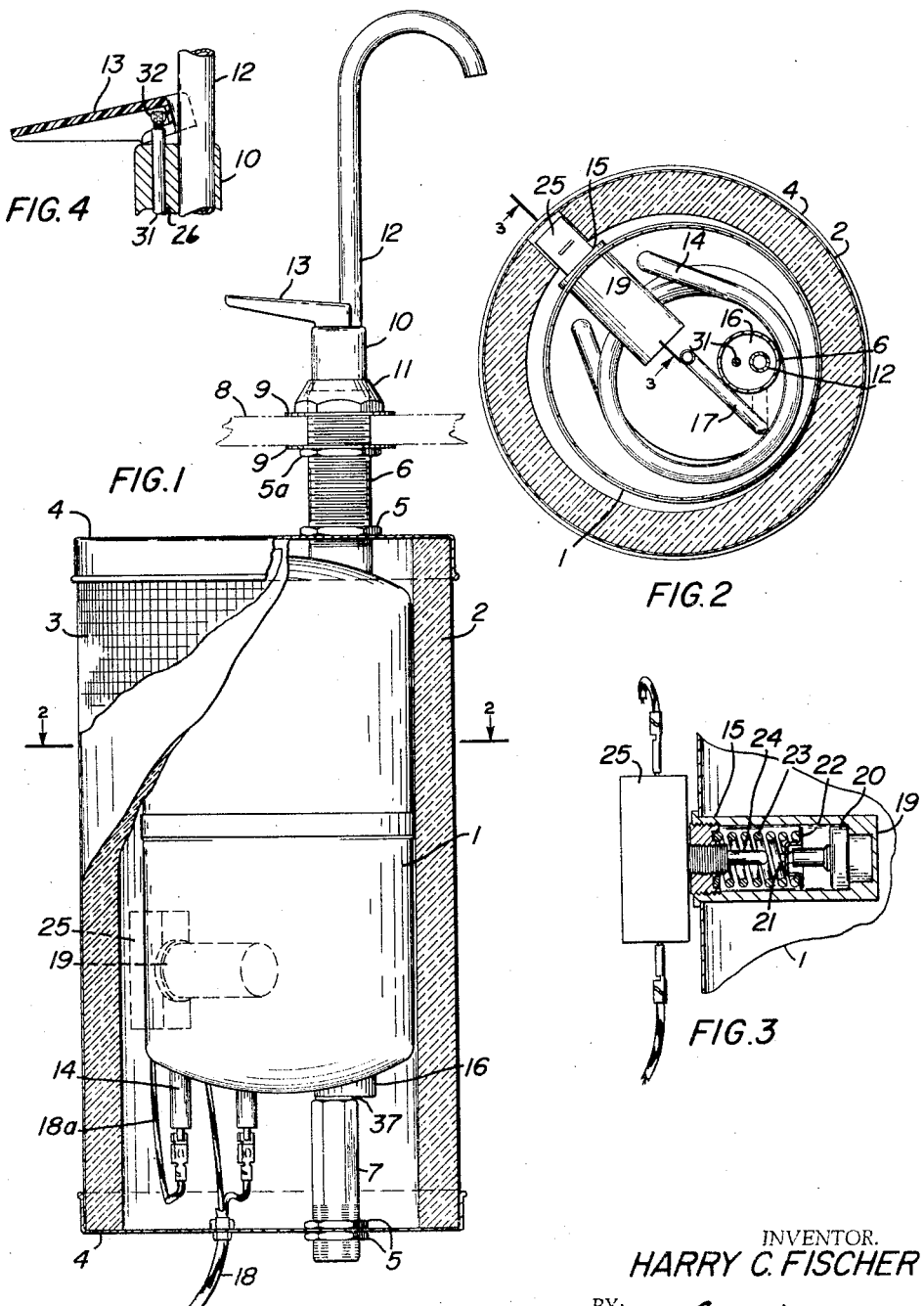

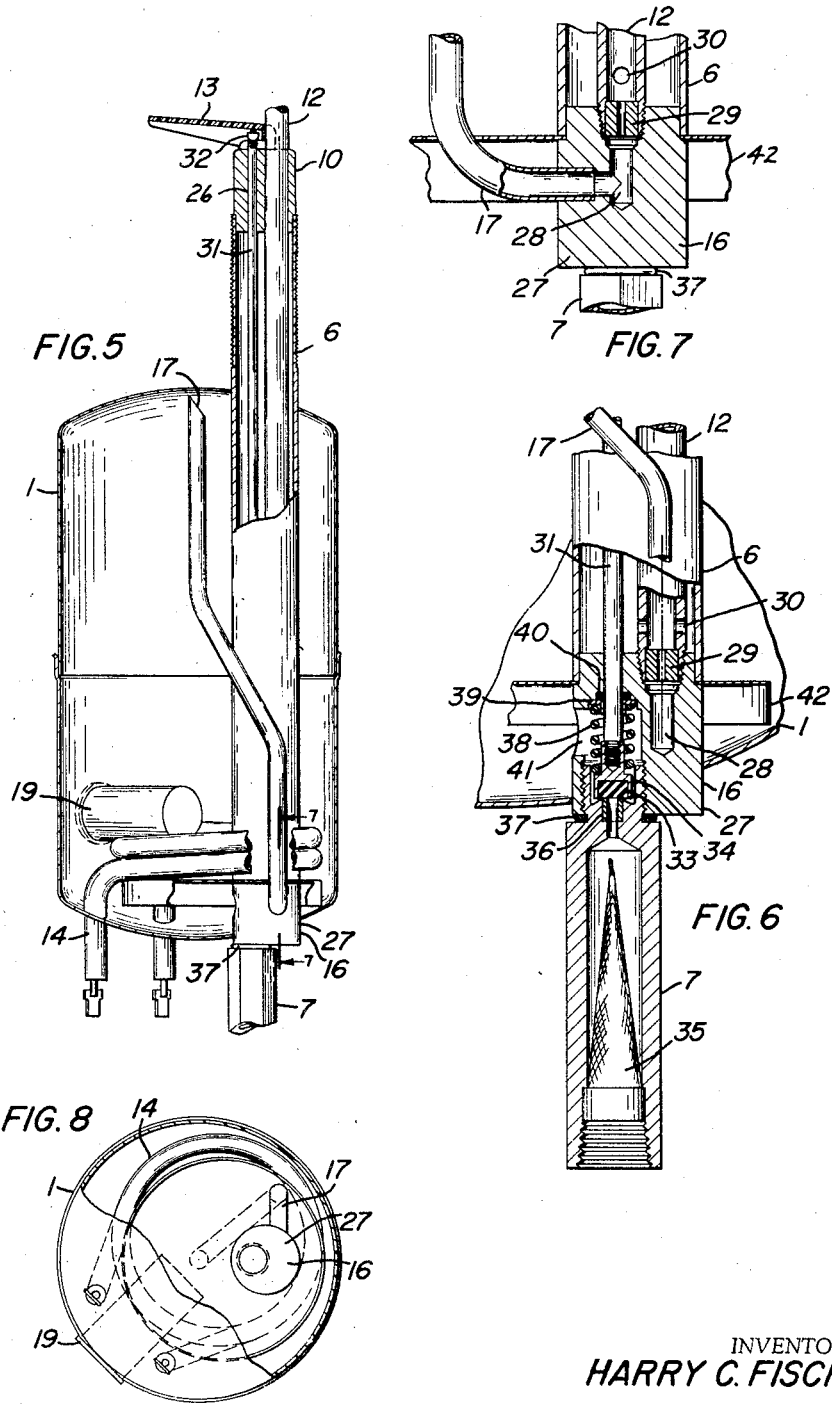

2,903,551

HOT WATER HEATER

Harry C. Fischer, Montville, N.J., assignor to Delta-T-Inc., Cedar Grove, N.J., a corporation of New Jersey Application September 25, 1957, Serial No. 686,133

12 Claims. (Cl. 219—39)

This invention relates to a hot water heater adapted to be connected with a domestic water supply system.

The object of this invention is to permit the automatic heating and storage of hot water immediately adjacent to the hot water tap in a compact unit easily installed and connected with a water supply and a source of electric power.

Another object is to provide means for accommodating the expansion of the heated water and for maintaining the water in the heater under atmospheric pressure during periods of storage.

An additional object is to expose the heated water to atmospheric pressure to rid it of dissolved gases which tend to affect its taste and clarity if not removed during the heating process.

A further object is to provide a heater that may be economically fabricated and maintained.

Still another object is to insure complete circulation of water in all portions of the heater.

Other objects will appear from the description which follows.

Referring to the drawings in which the same reference number refers to the same or a similar part:

Figure 1 is an elevational view partly in section of a complete heater embodying this invention, installed in operating position.

Figure 1 is a sectional view on line 2—2 of Figure 1.

Figure 3 is a sectional view along line 3—3 of Figure 2.

Figure 4 is a fragmentary view partly in section showing the valve handle in depressed or open position.

Figure 5 is an elevational view in section, similar to Figure 1 of the tank assembly only.

Figure 6 is an enlarged sectional view of the valve assembly and water inlet.

Figure 7 is a sectional view of the valve assembly along line 7—7 of Figure 5.

Figure 8 is a bottom view of Figure 5 partly in section.

In Figure 1 the heater is portrayed mounted in, and supported from, a platform 8 shown in broken lines a short distance either side of externally threaded sump tube 6 which pass through it and to which it is secured by cap nut 11 and lock nut 5a, tightened against washers 9. Platform 8 would normally be the rim of a sink, or tray, or the top of a cabinet, beneath which the heater might be conveniently and unobtrusively located.

Projecting from the bottom of the heater the threaded end of intake pipe 7 provides means for connecting with a water supply system, and cable 18 means for connecting with an electrical source. Projecting upward and outward from the top of the heater is sump tube 6 surmounted by cap 10 which has extending therefrom valve handle 13 and curved outlet pipe 12.

Referring now to the main body of the heater, it consists primarily of cylindrical tank 1 surrounded by insulating jacket 2, which in turn, is encased by a decorative cylindrical casing 3, capped at each end by a cap 4, each of which is secured by lock nuts 5.

Automatic heating of water within tank 1 is accomplished by an electrical heating system. Projecting inward of the side wall of tank 1 is cylindrical casing 19 designed to accommodate thermostat 15 for controlling switch 25 located on the outer surface of the side wall.

Thermostat 15 may be of any suitable commercially available type. Illustrated in detail in Figure 3, it has within casing 19, an expandable heat responsive element 20, plunger 21, spring cup 22, and spring 23. When plunger 21 is brought to bear upon plunger 24, it holds switch 25 in open position against the resistance of spring 23, thus interrupting the flow of current to the heating element 14 located in the bottom of tank 1. Contraction of element 20 will restore current to heating element 14 and the water heating cycle, within predetermined temperature limts, will be repeated.

The electrical connections to the heating element 14 and to switch 25 are shown in Figure 1 as cables 18 and 18a.

The admission, storage and discharge of water from tank 1 is accomplished by the construction and arrangement of the following parts. Admission of water, under pressure from the supply source, is through a filter screen 35 and a valve assembly 16 illustrated in Figure 6.

Intake pipe 7 is threaded into valve housing 27 and against ring gasket 37. Valve disc 33 held in valve disc holder 34 is seated atop valve seat 36 in the bore of intake pipe 7.

Threaded into valve disc holder 34 is the lower end of valve stem 31. Spring 38 bearing at its lower end against valve disc holder 34 and at its upper end against spring seat 39 in valve housing 27, urges valve disc 33 against valve seat 36 to prevent admission of water. O-ring 40 surrounds valve stem 31 where it passes through valve housing 27 to provide a water seal.

Valve stem 31 extends the length of sump tube 6, being slidably mounted near its lower end in valve housing 27 and near its upper end through passage 26 in cap 10. The upper mounting is not provided with a seal, but is a loose fit.

Valve stem 31 at its exterior end is connected by T nut 32 with valve handle 13. Depressing handle 13 raises valve disc 33 and permits water to flow through valve housing opening 41 directly into tank 1. Inverted cup-shaped baffle 42 over opening 41 prevents the too rapid mixing of entrant cold water with heated hot water already in the tank.

Water is stored in tank 1 and is subject to the heating act of heating element 14. When heated it expands into sump tube 6 and rids itself of dissolved gases. Expansion water and hitherto dissolved gases are discharged from tank 1 through discharge pipe 17, as will be seen best from an examination of Figures 5, 6 and 7. Discharge pipe 17 is open at its top and at the bottom connects with bore 28 in valve housing 27. Bore 28 is a right angle passage leading to outlet pipe 12 through an orifice in bushing 29. Ports 30 are let into the lower end of outlet pipe 12, thus giving free passage between pipe 12 and the bottom of sump tube 6. Sump tube 6 is open to atmospheric pressure because of ports 30 and outlet pipe 12. In addition, the loose fit of valve stem 31 in passage 26 furnishes an opening at the top of sump tube 6 into the atmosphere. Thus sump tube 6 serves as a well within tank 1 for standing water at atmospheric pressure.

The operation of the heater is as follows: To initially fill the tank valve, handle 13 is depressed and water will enter tank 1 under pressure, leaving via pipes 17 and 12. In passing through pipe 12 a jet pump effect is secured, drawing water or air from the bottom of sump tube 6 through ports 30 and up pipe 12. Releasing valve handle 13 will shut off the water and water that has not passed out of pipe 12 will fall back through ports 30 and stand in sump tube 6 at atmospheric pressure. The water in tank 1 has then been restored to atmospheric pressure. When so stored and under control of thermostat 15, the heating element 14 will function to raise the water temperature to a predetermined level. Expansion of the water will raise the level of the water standing in sump tube 6. When valve handle 13 is next depressed, the admission of cold water under pressure at the bottom of tank 1 will force hot water from the top out through pipes 17 and 12. In going up pipe 12, the heated standing water in sump tube 6 will be sucked into the outward bound stream, emptying sump tube 6. Shutting off the water will restore the tank water to atmospheric pressure as hereinbefore described and again make sump tube 6 available for surplus water produced by expansion under heat.

It is apparent that various modifications may be made in the materials, design and construction of the heater herein illustrated and described and, therefore, it is not intended that such illustration and description be a limitation upon the scope of this invention.

What I claim is:

1. A water heater of the character described, including a closed water tank; a vertical tube closed at the bottom and open at the top mounted in association with the tank with its top extending above the top of the tank; and a discharge pipe with an intake opening within the tank adjacent the top thereof and an outlet outside of and above the top of the tank, and lying for a portion of its length near the bottom of the vertical tube and having a port in such portion opening into the vertical tube.

2. A water heater of the character described, including a closed water tank; a vertical tube closed at the bottom, mounted within the tank and opening out through an opening in the top of the tank; and a discharge pipe with an intake opening within the tank adjacent the top thereof and an outlet outside of and above the top of the tank, the said discharge pipe lying for a portion of its length near the bottom of the vertical tube and having a port in such portion opening into the vertical tube.

3. A water heater comprising a closed substantially cylindrical water tank; an external casing spaced from said tank and disposed to confine insulating material therebetween; insulating material between the tank and said casing; electrical heating means disposed within the tank and operably connected with a thermostat mounted in the side of the tank; water supply means including a pipe passing into the tank with an opening for discharging water thereinto adjacent the bottom; a vertical tube closed at the bottom, mounted within the tank and extending outward therefrom through an opening in the top of the tank; a discharge pipe having an intake opening within the tank adjacent the top thereof and an outlet outside of and above the tank with a portion of its length within the vertical tube adjacent the bottom thereof; and a port in that portion of the discharge pipe lying within the vertical tube.

4. A water heater comprising a closed substantially cylindrical water tank; an external casing spaced from said tank and disposed to confine insulating material therebetween; insulating material between the tank and said casing; electrical heating means disposed within the tank adjacent the bottom thereof and operably connected with a thermostat mounted in the side of the tank; an opening in the bottom of the tank adapted to be connected to a water supply; a valve located in the said opening with an operating handle external the heater; a vertical tube closed at the bottom, mounted within the tank and extending from the bottom thereof upward and out through an opening in the top of the tank; a discharge pipe having an intake opening within the tank and near the top thereof and an outlet outside of and above the tank, the discharge pipe passing through the vertical tube near its bottom; and a port in the wall of the discharge pipe opening into the bottom of the vertical tube.

5. A water heater comprising a closed substantially cylindrical water tank; an external casing spaced from said tank and disposed to confine insulating material therebetween; insulating material between the tank and said casing; electrical heating means disposed within the tank adjacent the bottom thereof and operably connected with a thermostat mounted in the side of the tank; a water inlet pipe connected to an opening in the bottom of the tank; a valve located in the water inlet pipe with an operating handle external the heater; a vertical tube closed at the bottom, mounted within the tank and extending outward therefrom through an opening in the top of the tank; a discharge pipe having an intake opening within the tank adjacent the top thereof and an outlet outside of and above the tank and being disposed for a portion of its length within the vertical tube adjacent the bottom thereof; and a port in that portion of the discharge pipe lying within the vertical tube.

6. A water heater comprising a closed substantially cylindrical water tank; an external casing spaced from said tank and disposed to confine insulating material therebetween; insulating material between the tank and said casing; electrical heating means disposed within the tank adjacent the bottom thereof and operably connected with a thermostat mounted in the side of the tank; a water inlet pipe passing through an opening in the bottom of the tank; a valve located in the water inlet pipe adapted to discharge water into the tank adjacent the bottom thereof and having an operating handle external the heater; a vertical tube closed at the bottom, mounted within the tank and extending from the bottom thereof upward and out through an opening in the top of the tank; a discharge pipe within the tank extending from its intake opening near the top of the tank downward and passing through an opening in the said vertical tube adjacent the bottom thereof and thence extending upward within the vertical tube and out of its open end; and a port in the wall of the discharge pipe near the bottom of the vertical tube.

7. A water heater comprising a closed substantially cylindrical water tank, an external casing spaced from said tank and disposed to confine insulating material therebetween, insulating material between the tank and said casing; electrical heating means disposed within the said tank and operably connected with thermostat means mounted in the side of the said tank; a vertical tube extending from the bottom of the tank out through and above an opening in the top of the tank; a closure for the bottom of the vertical tube; a water supply intake pipe entering the bottom of the tank; a valve positioned across the open terminal end of the intake pipe and adapted to close the same; an opening from the valve into the tank adjacent the bottom thereof; a valve operating stem within the vertical tube and having a handle above the upper end of such tube; a discharge pipe having an open end within the tank adjacent the top thereof, leading to the vertical tube bottom closure; an outlet pipe within the vertical tube attached to the said closure at one end and having its other end external to and above the heater; a passage in vertical tube bottom closure connecting the discharge pipe and the outlet pipe; and a port in the outlet pipe adjacent its connection with said closure.

8. A water heater comprising a closed substantially cylindrical water tank; an external casing spaced from said tank and disposed to confine insulating material therebetween; insulating material between the tank and said casing; electrical heating means disposed within the said tank and operably connected with thermostat means mounted in the side of the said tank; a vertical tube extending from the bottom of the tank out through and above an opening in the top of the tank; a closure for the bottom of the vertical tube; a water supply intake pipe entering the bottom of the tank and terminating in the said closure; a valve in said closure positioned across the open terminal end of the intake pipe and adapted to close the same; an opening from the valve into the tank; a valve operating stem having a handle external to the heater; a discharge pipe having an open end within the tank adjacent the top thereof, leading to the vertical tube bottom closure; an outlet pipe within the vertical tube attached to the said closure at one end and having its other end external to and above the heater; a passage in the vertical tube bottom closure connecting the discharge pipe and the outlet pipe; and a port in the outlet pipe adjacent its connection with said closure.

9. A water heater comprising a closed substantially cylindrical water tank; an external casing spaced from said tank and disposed to confine insulating material therebetween; insulating material between the tank and said casing; electrical heating means disposed within the said tank adjacent the bottom thereof and operably connected with thermostat means mounted in the side of the said tank; a sump tube extending from the bottom of the tank out through and above an opening in the top of the tank; a closure for the bottom of the sump tube; a water supply intake pipe entering the bottom of the tank and terminating in the said closure; a valve in said closure positioned across the open terminal end of the intake pipe and adapted to close the same; an opening from the valve into the tank; a valve operating stem having a handle external to the heater, slidably mounted within the sump tube; a discharge pipe having an open end within the tank adjacent the top thereof, leading to the sump tube bottom closure; a vertical outlet pipe within the sump tube attached to the said closure at its lower end and having its upper end external to and above the heater; a passage in sump tube bottom closure connecting the discharge pipe and the outlet pipe; and a port in the outlet pipe adjacent its connection with said closure.

10. A water heater comprising a closed substantially cylindrical water tank; an external casing spaced from said tank and disposed to confine insulating material therebetween; insulating material between the tank and said casing; electrical heating means disposed within the said tank adjacent the bottom thereof and operably connected with thermostat means mounted in the side of the said tank; a sump tube extending from the bottom of the tank out through and above an opening in the top of the tank; a closure for the bottom of the sump tube having a passage therethrough; a cap for the top of the sump tube; a water supply intake pipe entering the bottom of the tank and terminating in the sump tube bottom closure; a valve in said closure positioned across the open terminal end of the intake pipe and adapted to close the same; an opening from the valve into the tank adjacent the bottom thereof; a valve operating stem having a handle external to the heater, extending the length of the sump tube and slidably mounted within the sump tube bottom closure and in the sump tube cap; a discharge pipe having its one end opening in the tank adjacent the top thereof, and its other end connected to the passage in the sump tube bottom closure; an outlet pipe extending for part of its length within the sump tube, connected to the passage in the sump tube bottom closure at one end and having its other end external to and above the top of the heater; and ports in the outlet pipe adjacent its connection with the sump tube bottom closure.

11. A water heater of the character described, including a closed water tank; an expansion chamber closed at the bottom and communicating with the atmosphere at the top mounted in heat exchange relation with the tank; and a discharge pipe with an intake opening within the tank adjacent to the top thereof and an outlet outside of and above the top of the tank and lying for a portion of its length near the bottom of the expansion chamber and having a port in such portion opening into the expansion chamber.

12. A water heater of the character described, including a closed water tank; an expansion chamber closed at the bottom and communicating with the atmosphere at the top mounted within the tank; and a discharge pipe with an intake opening within the tank adjacent to the top thereof and an outlet outside of and above the top of the tank and lying for a portion of its length near the bottom of the expansion chamber and having a port in such portion opening into the expansion chamber.

References Cited in the file of this patent
UNITED STATES PATENTS

| | | |
|---|---|---|
| 942,874 | Stevens | Dec. 7, 1909 |
| 2,110,251 | Wolcott | Mar. 8, 1938 |
| 2,694,768 | Stiebel | Nov. 16, 1954 |